(12) United States Patent
Hayakawa et al.

(10) Patent No.: US 10,047,752 B2
(45) Date of Patent: Aug. 14, 2018

(54) FUEL PUMP

(71) Applicant: DENSO CORPORATION, Kariya, Aichi-pref. (JP)

(72) Inventors: Tetsuo Hayakawa, Kariya (JP); Hiromi Sakai, Kariya (JP); Kiyoshi Nagata, Kariya (JP)

(73) Assignee: DENSO CORPORATION, Kariya (JP)

( * ) Notice: Subject to any disclaimer, the term of this patent is extended or adjusted under 35 U.S.C. 154(b) by 312 days.

(21) Appl. No.: 14/912,544

(22) PCT Filed: Sep. 3, 2014

(86) PCT No.: PCT/JP2014/004530
§ 371 (c)(1),
(2) Date: Feb. 17, 2016

(87) PCT Pub. No.: WO2015/040812
PCT Pub. Date: Mar. 26, 2015

(65) Prior Publication Data
US 2016/0201680 A1    Jul. 14, 2016

(30) Foreign Application Priority Data

Sep. 17, 2013  (JP) ................................. 2013-191597
May 15, 2014  (JP) ................................. 2014-101349

(51) Int. Cl.
*F04D 13/06*   (2006.01)
*F04D 29/52*   (2006.01)
(Continued)

(52) U.S. Cl.
CPC ............. *F04D 13/06* (2013.01); *F02M 37/10* (2013.01); *F04D 29/528* (2013.01); *H02K 5/12* (2013.01);
(Continued)

(58) Field of Classification Search
CPC ...... F02M 37/10; F04D 13/06; F04D 13/0653; H02K 2201/00; H02K 1/16; H02K 15/02–15/024
See application file for complete search history.

(56) References Cited

U.S. PATENT DOCUMENTS 3,854,181 A * 12/1974 Matsuwake ............. H01G 5/06
219/118
4,114,019 A *  9/1978 Sandor ................... B23K 9/025
219/137 R
(Continued)

FOREIGN PATENT DOCUMENTS

JP      3-45065      4/1991
JP    2004-222342    8/2004
(Continued)

OTHER PUBLICATIONS

International Search Report and Written Opinion of the ISA for PCT/JP2014/004530, dated Oct. 28, 2014, 14 pages.
(Continued)

*Primary Examiner* — Charles Freay
*Assistant Examiner* — Thomas Fink
(74) *Attorney, Agent, or Firm* — Nixon & Vanderhye PC (57) ABSTRACT

A fuel chamber is formed between a pump arrangement and a motor arrangement, and outer flow passages are formed between a stator of the motor arrangement and a housing. Fuel, which is discharged from a discharge port of the pump arrangement, is outputted to an outside of the housing from a fuel discharge conduit that is formed on a side of the motor arrangement, which is opposite from the pump arrangement, after passing through the motor arrangement. At a time of performing electroplating on the stator, electrode contact portions, to which electrodes can contact, is formed in an outer wall of the stator, which forms the outer flow passages.

8 Claims, 9 Drawing Sheets

(51) Int. Cl.
*F02M 37/10* (2006.01)
*H02K 5/12* (2006.01)
*H02K 15/02* (2006.01)
H02K 7/14 (2006.01)
H02K 3/44 (2006.01)
H02K 5/08 (2006.01)
F02M 37/08 (2006.01)

(52) U.S. Cl.
CPC ....... *H02K 15/02* (2013.01); *F02M 2037/082* (2013.01); *H02K 3/44* (2013.01); *H02K 5/08* (2013.01); *H02K 7/14* (2013.01)

(56) References Cited

U.S. PATENT DOCUMENTS

| | | | | |
|---|---|---|---|---|
| 4,242,182 A | * | 12/1980 | Popescu | C25D 3/32 205/303 |
| 4,408,138 A | * | 10/1983 | Okamoto | H02K 41/03 310/12.02 |
| 5,448,329 A | | 9/1995 | Nakata | |
| 5,487,824 A | * | 1/1996 | Griego | B22F 1/025 204/201 |
| 5,943,760 A | * | 8/1999 | Barzideh | H02K 15/022 29/596 |
| 2003/0185693 A1 | * | 10/2003 | Iwanari | F02M 37/048 417/423.7 |
| 2004/0253125 A1 | * | 12/2004 | Kobayashi | F02M 37/048 417/410.1 |
| 2007/0052310 A1 | | 3/2007 | Sakai et al. | |
| 2008/0063546 A1 | | 3/2008 | Itoh et al. | |
| 2010/0034674 A1 | * | 2/2010 | Oota | F02M 37/08 417/410.1 |
| 2011/0160377 A1 | * | 6/2011 | Chung | C08L 25/12 524/504 |

FOREIGN PATENT DOCUMENTS

| | | |
|---|---|---|
| JP | 2006-022733 | 1/2006 |
| JP | 2006-165361 | 6/2006 |
| JP | 2006-197764 | 7/2006 |
| JP | 2009-247191 | 10/2009 |
| JP | 2010-057319 | 3/2010 |
| JP | 2013-150536 | 8/2013 |
| WO | WO 2015/040811 | 3/2015 |
| WO | WO 2015/040813 | 3/2015 |
| WO | WO 2015/040814 | 3/2015 |

OTHER PUBLICATIONS

Standard compilation—electric equipment for the forced safe certification of the electrical industry product, electric welder winding, "Standard compilation editing committee for the forced safe certification of the electrical industry product", p. 278, Dec. 2003 (8 pages).

* cited by examiner

FUEL PUMP

CROSS REFERENCE TO RELATED APPLICATION

This application is the U.S. national phase of International Application No. PCT/JP2014/004530 filed on Sep. 3, 2014 and based on and incorporates herein by reference Japanese Patent Application No. 2013-191597 filed on Sep. 17, 2013 and Japanese Patent Application No. 2014-101349 filed on May 15, 2014.

TECHNICAL FIELD

The present disclosure relates to a fuel pump.

BACKGROUND ART

Previously, a fuel pump, which pumps fuel of a fuel tank to an internal combustion engine, is known.

The fuel pump of the Patent Literature 1 includes a motor arrangement, which is placed in an inside of a housing configured into a tubular form, and a pump arrangement, which is rotated by the motor arrangement. The fuel, which is pressurized by the pump arrangement, is conducted through a flow passage, which is formed between a stator and a rotor of the motor arrangement, and this fuel is pumped to the internal combustion engine through a fuel discharge conduit that is formed on an opposite side of the motor arrangement that is opposite from the pump arrangement.

In the fuel pump of the Patent Literature 1, the stator of the motor arrangement is formed through injection molding of a composite material, which includes a magnetic material and resin. This stator has a trace of an injection port that is formed at a location where the composite material is injected into an inside of a mold through the injection port at the time of injection molding. This trace of the injection port is formed in an end surface of the stator, which is opposite from a pump chamber in the axial direction of the stator. Therefore, if rust, which is formed at the trace of the injection port, expands to a large size and is brought to a location between the stator and the rotor, the rotation of the rotor may possibly be interfered.

CITATION LIST

Patent Literature

PATENT LITERATURE 1: JP5142463 B2 (corresponding to US2007/0052310A1)

SUMMARY OF INVENTION

The present disclosure is made in view of the above point, and it is an objective of the present disclosure to provide a fuel pump that can maintain rotation of a motor arrangement and rotation of a pump arrangement.

According to the present disclosure, there is provided a fuel pump that includes a pump arrangement, a motor arrangement, a housing, a fuel discharge conduit and an electrode contact portion. The pump arrangement has a casing, an impeller and a discharge port. The casing includes a pump chamber that is communicated with a suction port, through which fuel is drawn into the pump chamber. The impeller pressurizes the fuel in the pump chamber. The discharge port discharges the fuel, which is pressurized through rotation of the impeller, from the pump chamber to an outside of the casing. The motor arrangement has a rotor, which is placed on one axial side of the impeller of the pump arrangement and rotates the impeller, and a stator, which is configured into a ring form and is placed on a radially outer side of the rotor. The housing is configured into a tubular form and is placed on an outer side of the stator. The housing forms a fuel chamber at a location between the pump arrangement and the motor arrangement, and the housing forms an outer flow passage on the outer side of the stator. The fuel discharge conduit is placed on an opposite side of the motor arrangement, which is opposite from the pump arrangement. The fuel discharge conduit discharges the fuel, which flows from the discharge port of the pump arrangement through the motor arrangement, to an outside of the housing. The electrode contact portion is formed in an outer wall of the stator that forms the outer flow passage. An electrode is contactable with the electrode contact portion at a time of performing electroplating on the stator.

Since the electroplating is not performed in the electrode contact portion, the rust may possibly be generated there. When the rust, which is formed in the electrode contact portion, is removed from the electrode contact portion, the rust passes through the outer flow passage and is discharged from the fuel discharge conduit that is placed on the opposite side of the motor arrangement, which is opposite from the pump arrangement. Therefore, the intrusion of the rust between the rotor and the stator is limited, and intrusion of the rust into the inside of the pump arrangement is limited. As a result, the fuel pump can maintain the rotation of the electric motor and the rotation of the pump arrangement.

The electrode contact portion is a trace of contact of the electrode at the time of performing electroplating on the stator.

DESCRIPTION OF EMBODIMENTS

Hereinafter, embodiments of the present disclosure will be described with reference to the accompanying drawings.

First Embodiment

FIGS. 1 to 7 show a first embodiment of the present disclosure. A fuel pump 1 of the present disclosure is of an in-tank type, which is placed in an inside of a fuel tank 2. The fuel pump 1 pressurizes fuel drawn from a fuel tank 2 and pumps the drawn fuel to an internal combustion engine 4 through a fuel conduit 3. A filter 5, which captures foreign objects contained in the fuel, is installed in the fuel conduit 3.

(Entire Structure of Fuel Pump)

First of all, an entire structure of the fuel pump 1 will be described.

Figure 1:
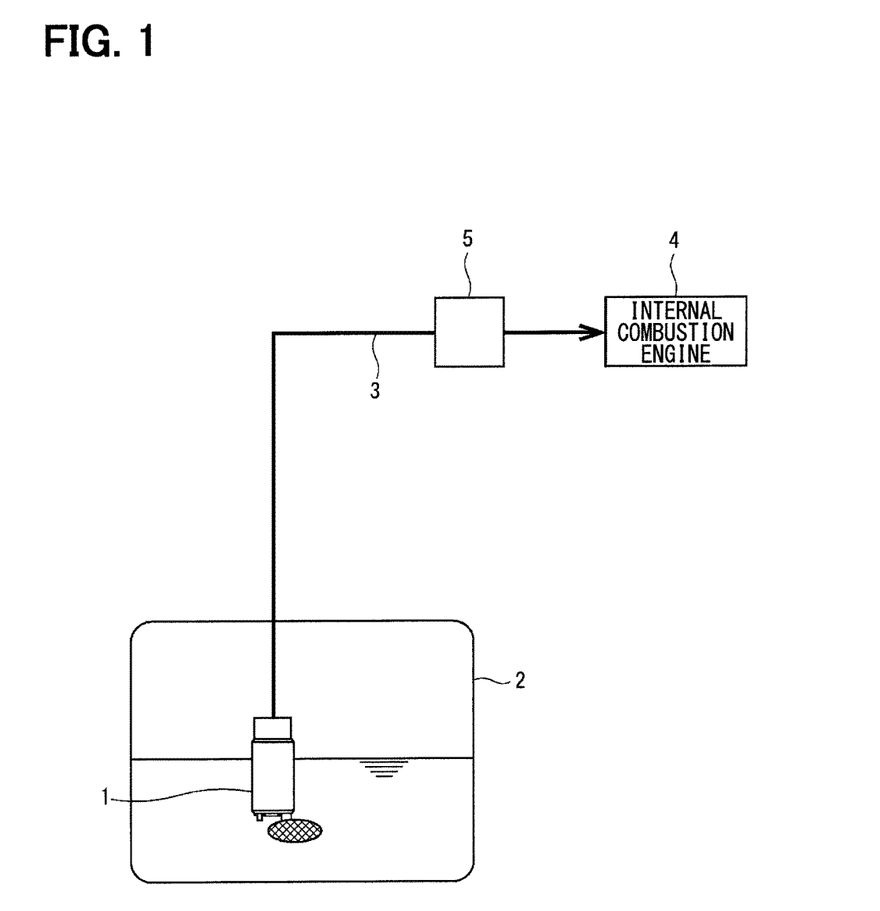
FIG. 1 is a diagram indicating a structure of a fuel supply system, in which a fuel pump of a first embodiment of the present disclosure is used.
Figure 2:
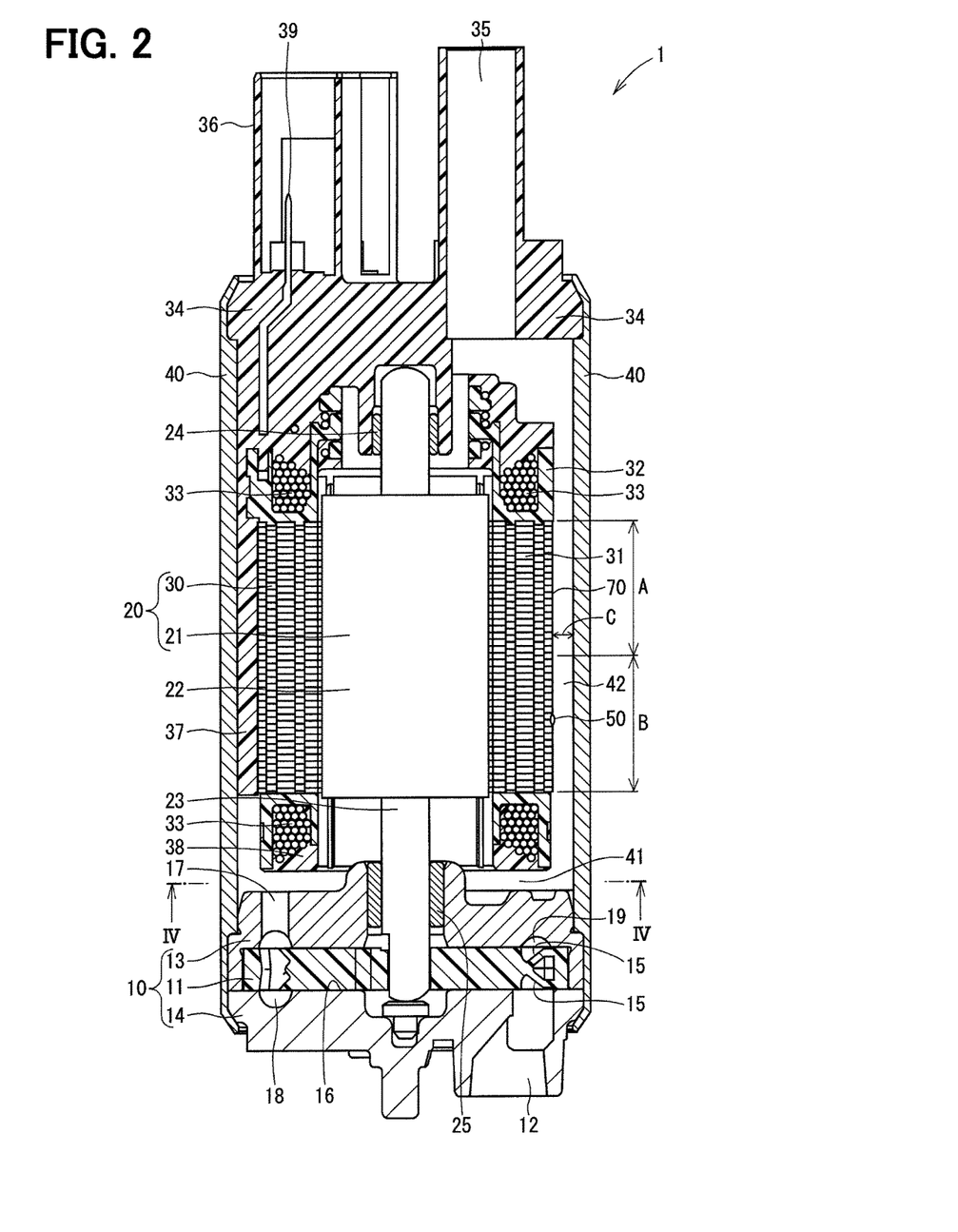
FIG. 2 is a cross-sectional view of the fuel pump of the first embodiment.
Figure 3:
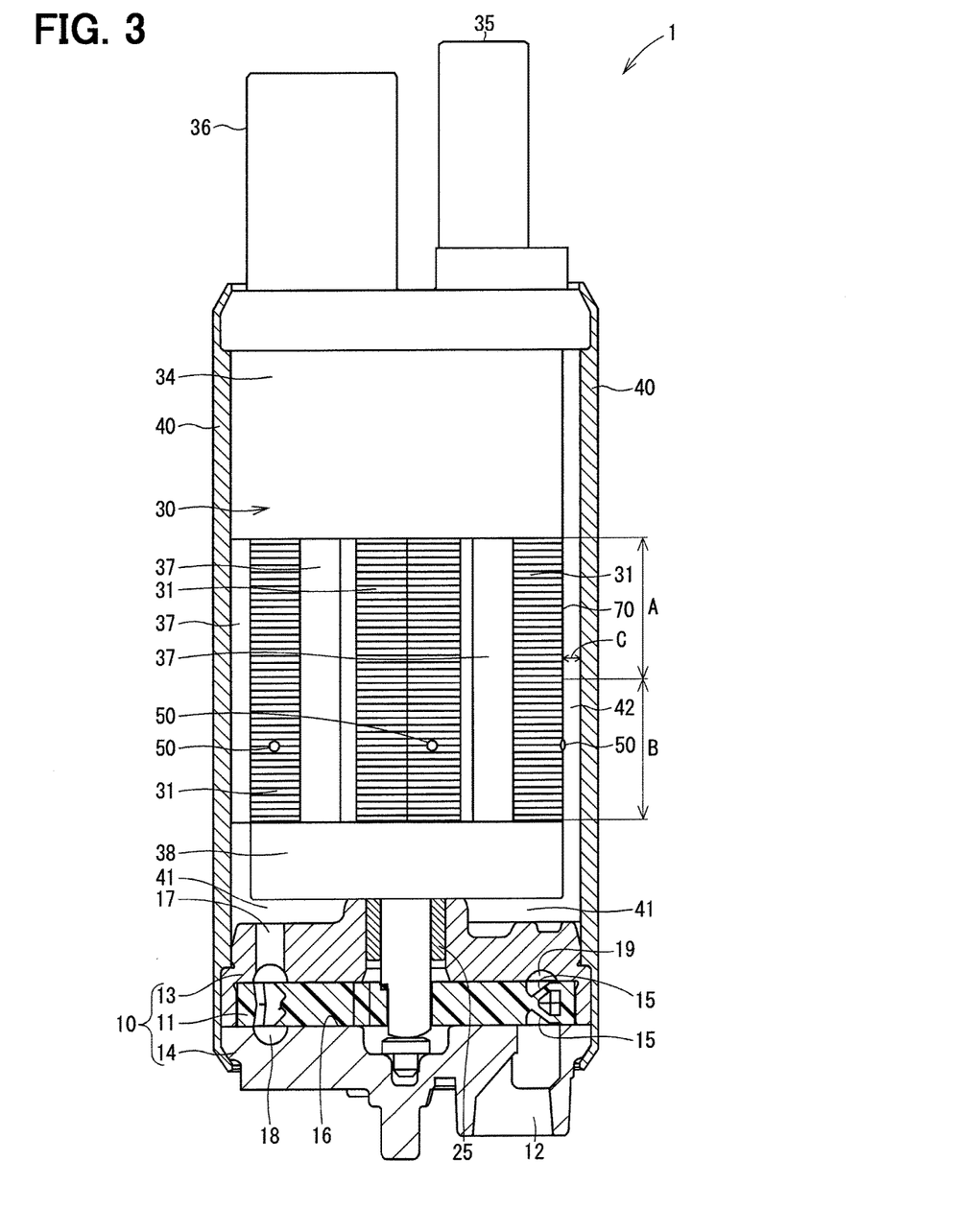
FIG. 3 is a cross-sectional view of the fuel pump of the first embodiment, showing an outer view of a stator.
Figure 4:
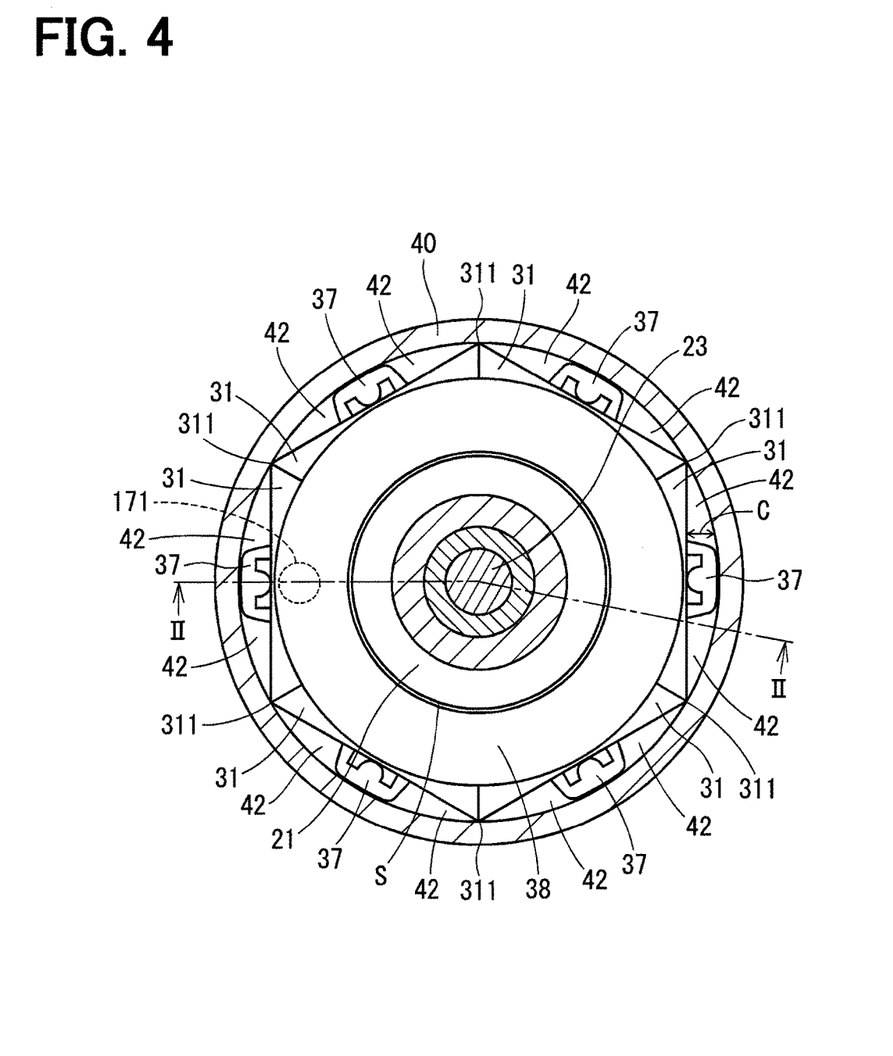
FIG. 4 is a cross-sectional view taken along line IV-IV in FIG. 2.

As shown in FIGS. 2 to 4, the fuel pump 1 includes a pump arrangement 10, a motor arrangement 20 and a housing 40. The fuel pump 1 is placed in the inside of the fuel tank 2 such that the pump arrangement 10 is placed at a lower side of the fuel pump 1 in the direction of the gravitational force, and the motor arrangement 20 is placed at an upper side of the fuel pump 1 in the direction of the gravitational force. The fuel pump 1 draws the fuel from a suction port 12, which is shown at a lower side in FIG. 2, through rotation of an impeller 11 of the pump arrangement 10, and the fuel pump 1 pressurizes the drawn fuel and discharges the pressurized fuel from a fuel discharge conduit 35, which is shown at an upper side of FIG. 2.

The pump arrangement 10 includes the impeller 11, an upper casing 13 and a lower casing 14. The upper casing 13 and the lower casing 14 correspond to a casing of the present disclosure.

A pump chamber 16, which receives the impeller 11 is formed between the upper casing 13 and the lower casing 14.

The impeller 11 includes a plurality of blade grooves 15, which are arranged one after another in a circumferential direction. The impeller 11 is fixed to a shaft 23 of the motor arrangement 20 and is rotated integrally with the shaft 23.

The lower casing 14 includes the suction port 12, through which the fuel is drawn into the pump chamber 16 from the outside of the fuel pump 1. The upper casing 13 includes the discharge port 17, through which the fuel is discharged from the pump chamber 16 to the motor arrangement 20 side.

The lower casing 14 includes a fuel flow passage 18, and the upper casing 13 includes a fuel flow passage 19. These fuel flow passages 18, 19 extend from the suction port 12 to the discharge port 17 and correspond to the blade grooves 15 of the impeller 11. Each of the fuel flow passages 18, 19 is configured into a C-shape in an axial view and is communicated with the pump chamber 16.

When the impeller 11 is rotated along with the shaft 23 of the motor arrangement 20, the fuel is drawn into the pump chamber 16 and the fuel flow passages 18, 19 through the suction port 12. Due to the rotation of the impeller 11, the drawn fuel flows as a swirl flow between the blade grooves 15 and the fuel flow passages 18, 19, and the drawn fuel is pressurized as the flow moves from the suction port 12 toward the discharge port 17 and is thereafter discharged from the discharge port 17.

The motor arrangement 20 is a brushless motor and includes a rotor 21 and a stator 30.

The rotor 21 includes a rotor core 22 and the shaft 23. The rotor core 22 is made of a magnetic material and is rotatably received on an inner side of the stator 30. The rotor core 22 is magnetized to have N-poles and S-poles, which are alternately arranged one after another in a circumferential direction.

The shaft 23 is securely press-fitted into a center of the rotor core 22 and is rotated integrally with the rotor core 22. One end portion of the shaft 23 is rotatably supported by a bearing 24, which is installed to a motor cover 34, and the other end portion of the shaft 23 is rotatably supported by a bearing 25, which is installed to the upper casing 13.

The stator 30 includes a stator core 31, an insulator 32, a plurality of coils 33 and the motor cover 34.

The stator core 31 is made of laminated iron plates (laminated steel plates) and is configured into a ring form. The stator core 31 is placed on a radially outer side of the rotor 21. The stator core 31 has, for example, six slots and is configured into a generally hexagonal form in the axial view of the stator core 31. As shown in FIG. 4, the stator core 31 is placed such that six corners 311 of the hexagonal form of the stator core 31 contact an inner wall of the housing 40.

As shown in FIG. 2, the insulator 32 is formed to resin mold the stator core 31. The coils 33 are wound around the insulator 32 to form three-phase coils. The insulator 32, around which the coils 33 are wound, is integrally resin molded by the motor cover 34.

The motor cover 34 includes the fuel discharge conduit 35, a connector 36, a plurality of partitions 37 and a coil protective portion 38.

The fuel discharge conduit 35 is configured into a tubular form and projects on a side of the motor arrangement 20, which is opposite from the pump arrangement 10. The fuel discharge conduit 35 outputs the fuel, which is pressurized by the pump arrangement 10, to the outside of the motor arrangement 20.

The connector 36 includes three terminals 39, which are placed in an inside of the connector 36 and are electrically connected to the three-phase coils of the stator 30.

The partitions 37 are placed on a radially outer side of the stator core 31 and extend in the axial direction of the stator core 31. In the present embodiment, the number of the partitions 37 is six. As shown in FIG. 4, each of these six partitions 37 is placed at a center of a corresponding one of six sides of the stator core 31, which is configured into the hexagonal form in the axial view of the stator core 31.

The coil protective portion 38 is configured into a cylindrical tubular form and is placed on the pump arrangement side of the stator 30 to protect a coil end.

The housing 40 is configured into a tubular form and is placed on a radially outer side of the stator 30. One axial end portion of the housing 40 is radially inwardly crimped against the motor cover 34 to securely hold the motor cover 34. The other axial end portion of the housing 40 is radially inwardly crimped to securely hold the lower casing 14 and the upper casing 13.

A fuel chamber 41 is formed between the motor arrangement 20 and the pump arrangement 10, which are securely held by the housing 40. Furthermore, a plurality of outer flow passages 42 is formed between the inner wall of the housing 40 and an outer wall of the stator core 31. The outer flow passages 42 are partitioned by the partitions 37, which extend in the axial direction, and the corners 311 of the stator core 31. Therefore, the outer flow passages 42 extend in the axial direction and are placed one after another in the circumferential direction at a location between the housing 40 and the stator core 31.

A gap S formed between the rotor 21 and the stator 30, and the outer flow passages 42 serve as flow passages of the fuel, which conduct the fuel from the fuel chamber 41 to the fuel discharge conduit 35. In the present embodiment, a cross-sectional area of the outer flow passages 42 is larger than a cross-sectional area of the gap S between the rotor 21 and the stator 30. Therefore, a flow quantity of the fuel, which flows in the outer flow passages 42, is larger than a flow quantity of the fuel, which flows in the gap S between the rotor 21 and the stator 30.

Furthermore, a distance C between the housing 40 and the stator 30, which form the outer flow passages 42, is set to a value that enables suctioning of the fuel from the fuel chamber 41 through the outer flow passages 42 by a surface tension of the fuel.

When the three-phase electric power is supplied from the terminals 39 of the connector 36 of the motor cover 34 to the coils 33 of the stator 30 of the respective phases, a rotating magnetic field is generated in the stator 30. Thereby, the rotor 21 and the shaft 23 are rotated. In this way, the impeller 11 of the pump arrangement 10 is rotated. The fuel, which is pressurized by the pump arrangement 10, is discharged from the discharge port 17 of the upper casing 13 into the fuel chamber 41.

The fuel of the fuel chamber 41 mainly flows through the outer flow passages 42 and is outputted to the outside of the motor arrangement 20 through the fuel discharge conduit 35 of the motor cover 34.

(Characteristic Construction of Fuel Pump)

Next, the characteristic construction of the fuel pump 1 of the present disclosure will be described. In the present embodiment, for example, the stator 30 is electroplated to improve corrosion resistance to withstand, for example, low-quality fuel.

For example, acid tin plating or neutral tin plating may be used as the electroplating. A pH of a plating bath of the acid tin plating is lower than a pH of a plating bath of the neutral tin plating.

In a case where a material, such as PPS, which has relatively high resistance to acid cracking and thereby barely has the acid cracking, is used as the resin material of, for example, the insulator 32 and the motor cover 34 of the stator 30, the acid tin plating is suitable. Thereby, the corrosion resistance to the low-quality fuel can be improved.

In a case where a material, such as POM, which has relatively low resistance to acid cracking and thereby has a relatively high probability of having the acid cracking, is used as the resin material of, for example, the insulator 32 and the motor cover 34 of the stator 30, the neutral tin plating is suitable. Thereby, the acid cracking of the resin material can be limited, and the corrosion resistance to the low-quality fuel can be improved. The insulator 32 and the motor cover 34 serve a resin portion of the stator 30 of the present disclosure.

At the time of performing the electroplating, portions of the resin material, to each of which a corresponding one of electrodes contacts, will not have a plated metal layer, and thereby these portions are left as traces. These traces will be hereinafter referred to as electrode contact portions. More specifically, the stator core 31 is a laminated core, which includes the steel plates made of the magnetic material (iron) and has a plated metal surface 70 at a surface of the laminated core. The electrode contact portions 50 are exposed areas, in each of which the magnetic material is exposed to the outside at the plated metal surface 70.

As shown in FIGS. 2 to 4, in the present embodiment, the electrode contact portions 50 are formed in an outer wall of the stator 30, which forms the outer flow passages 42. Specifically, the electrode contact portions 50 are formed in the outer wall of the stator core 31 located at the outer side of the stator core 31 in the radial direction of the stator core 31. In other words, in the present embodiment, the number of the electrode contact portions 50 is six, and these six electrode contact portions 50 are formed in six areas, respectively, which are in the outer wall of the stator core 31 located at the outer side of the stator core 31 in the radial direction of the stator core 31 and are exposed in a corresponding one of the outer flow passages 42.

Each one of the teeth of the stator core 31 is provided with a corresponding one of the electrode contact portions 50. Furthermore, the electrode contact portions 50 are axially placed on the pump arrangement side of the axial center of the stator core 31. An axial length of an axial area A and an axial length of an axial area B of the stator core 31 shown in FIGS. 2 and 3 are equal to each other. Each of the axial length of the axial area A and the axial length of the axial area B is one half of an axial length of the stator core 31. The electrode contact portions 50 are formed in the axial area B.

In FIG. 4, a projected location of the discharge port 17 of the pump arrangement 10, which is formed by axially projecting the discharge port 17 onto the stator 30, is indicated by a dotted line 171. The electrode contact portions 50 are respectively placed at the corresponding locations, which are other than the location immediately above the discharge port 17 of the pump arrangement 10 in the direction of the gravitational force (e.g., the locations, which are other than the location that is opposed to the discharge port 17 of the pump arrangement 10 in the axial direction).

The locations of the electrode contact portions 50 are not limited to the depicted locations, each of which is depicted with a circle indicated by a reference sign 50 in FIGS. 2 and 3. That is, it is only required that the electrode contact portions 50 are placed at the corresponding locations, which are in the outer wall of the stator core 31 located at the outer side of the stator core 31 in the radial direction of the stator core 31 and are in the axial area that is on the pump arrangement side of the axial center of the stator core 31 in the outer wall of the stator core 31.

Here, it should be noted that the electrode contact portions 50 should not be formed in an inner wall of the stator core 31, which is located at the inner side of the stator core 31 in the radial direction of the stator core 31. This is due to the following reason. That is, the rotor 21 is placed on the radially inner side of the stator core 31. Therefore, if rust is formed in the electrode contact portions 50 formed in the inner wall of the stator core 31, it will interfere the rotation of the rotor 21.

(Plating Method of Stator)

Figure 6:
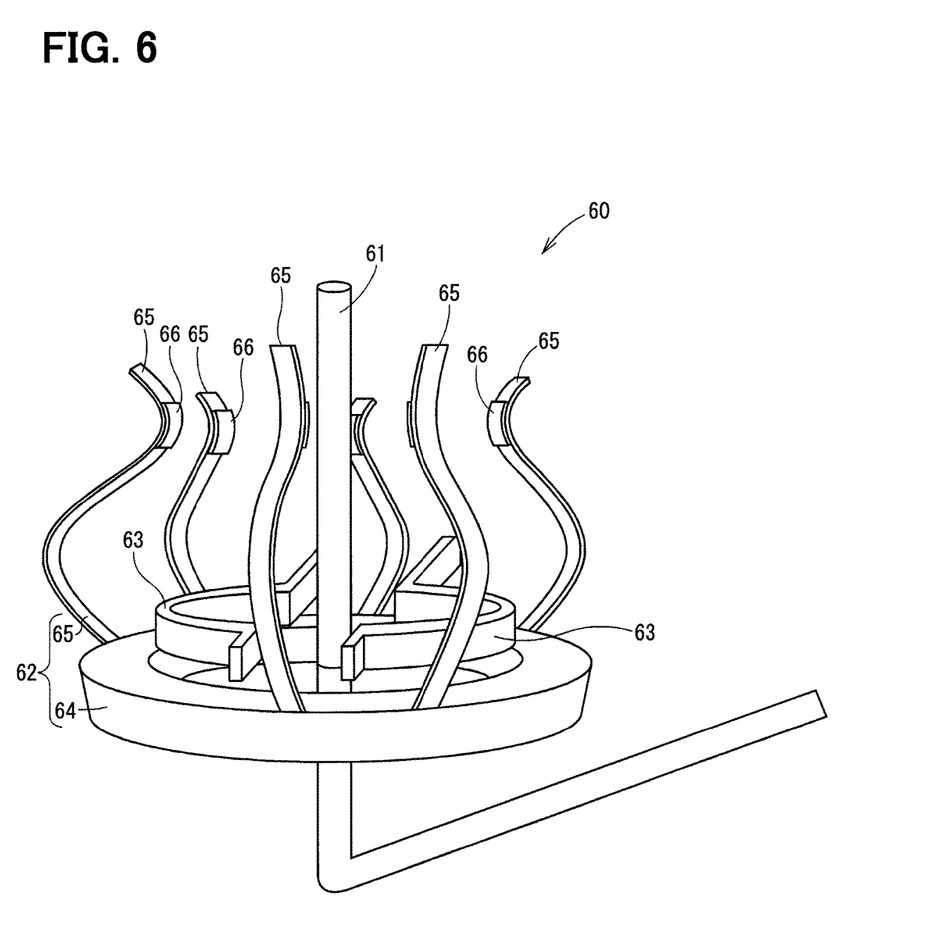
FIG. 6 is a view of an electrode device used for plating of a stator according to the first embodiment.

FIG. 6 indicates an electrode device used for the electroplating of the stator 30.

The electrode device 60 includes an anode 61, a cathode 62 placed around the anode 61, and a pedestal 63. The cathode 62 includes a base portion 64, which is configured into a ring form, and a plurality of arms 65, which project upward from the base portion 64. The number of the arms 65 is six, which corresponds to the number of the teeth of the stator core 31. An end surface 66 of each arm 65, which is located on an inner side in the radial direction, forms a contact portion that contacts the corresponding electrode contact portion 50 of the stator core 31.

The pedestal 63, on which the stator 30 is placed, is formed on the base portion 64 of the cathode 62.

Figure 7:
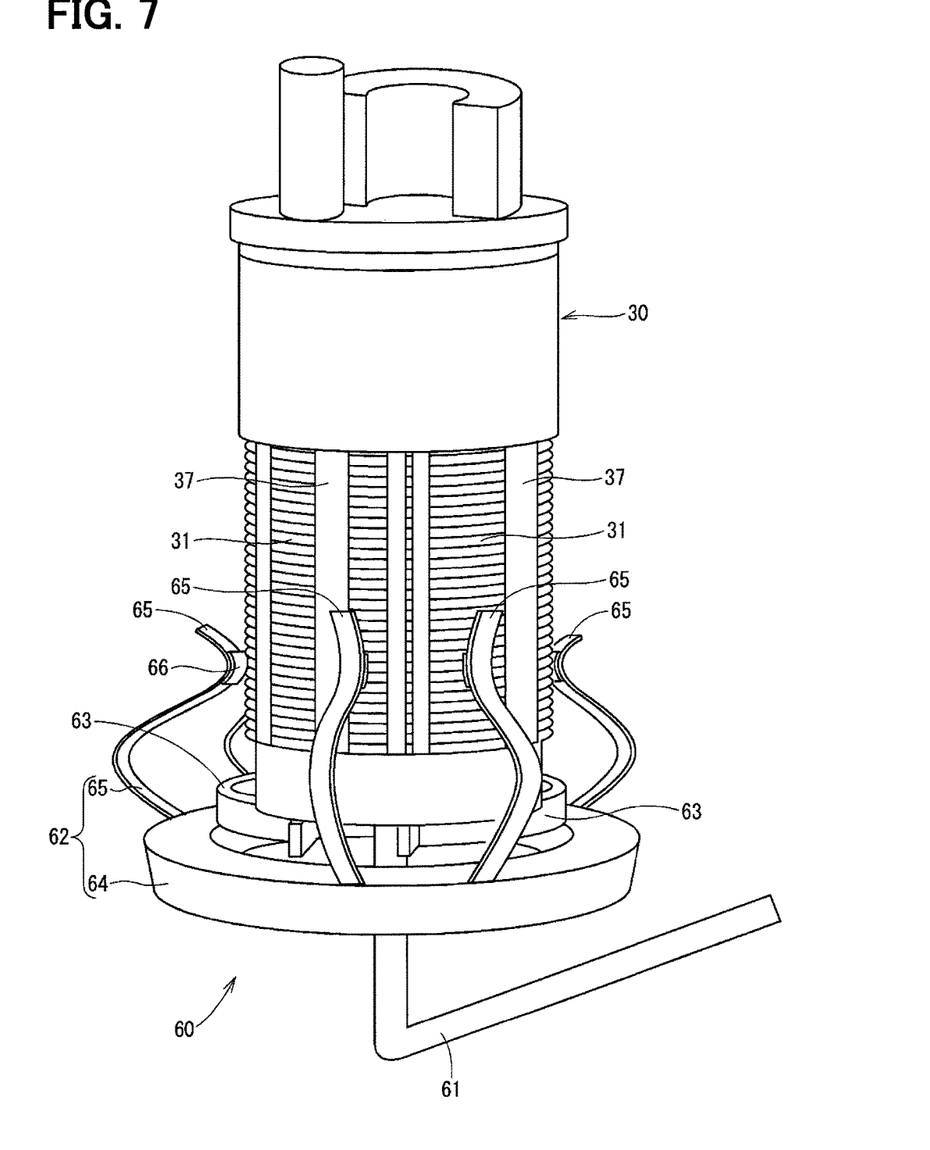
FIG. 7 is a descriptive view showing a state where the stator is placed on the electrode device of FIG. 6.

As shown in FIG. 7, the stator 30 is placed on the pedestal 63, and the arms 65 of the cathode 62 are engaged with the stator core 31. In this state, the electrode device 60 and the stator 30 are immersed in an electrolyte solution, which contains metal, such as the tin (Sn), and the electric current is conducted from the anode 61 to the cathode 62. In this way, the metal, which is dissolved in the electrolyte solution, is chemically reduced on the surface of the stator core 31, and thereby the surface of the stator core 31 is plated with the metal. Thus, the plated metal surface 70 is formed.

Thereafter, the electrode device 60 and the stator 30 are removed from the electrolyte solution, and the stator 30 is removed from the electrode device 60. At this time, the plated metal layer is not formed in the contact area of the stator core 31, to which the cathode 62 of the electrode device 60 contacts. Therefore, this contact area of the stator core 31 forms the electrode contact portion 50, which is the trace of the electrode (the exposed area, at which the magnetic material is exposed to the outside). When this electrode contact portion 50 is exposed to the air, the rust may possibly be formed in the electrode contact portion 50.

Figure 5:
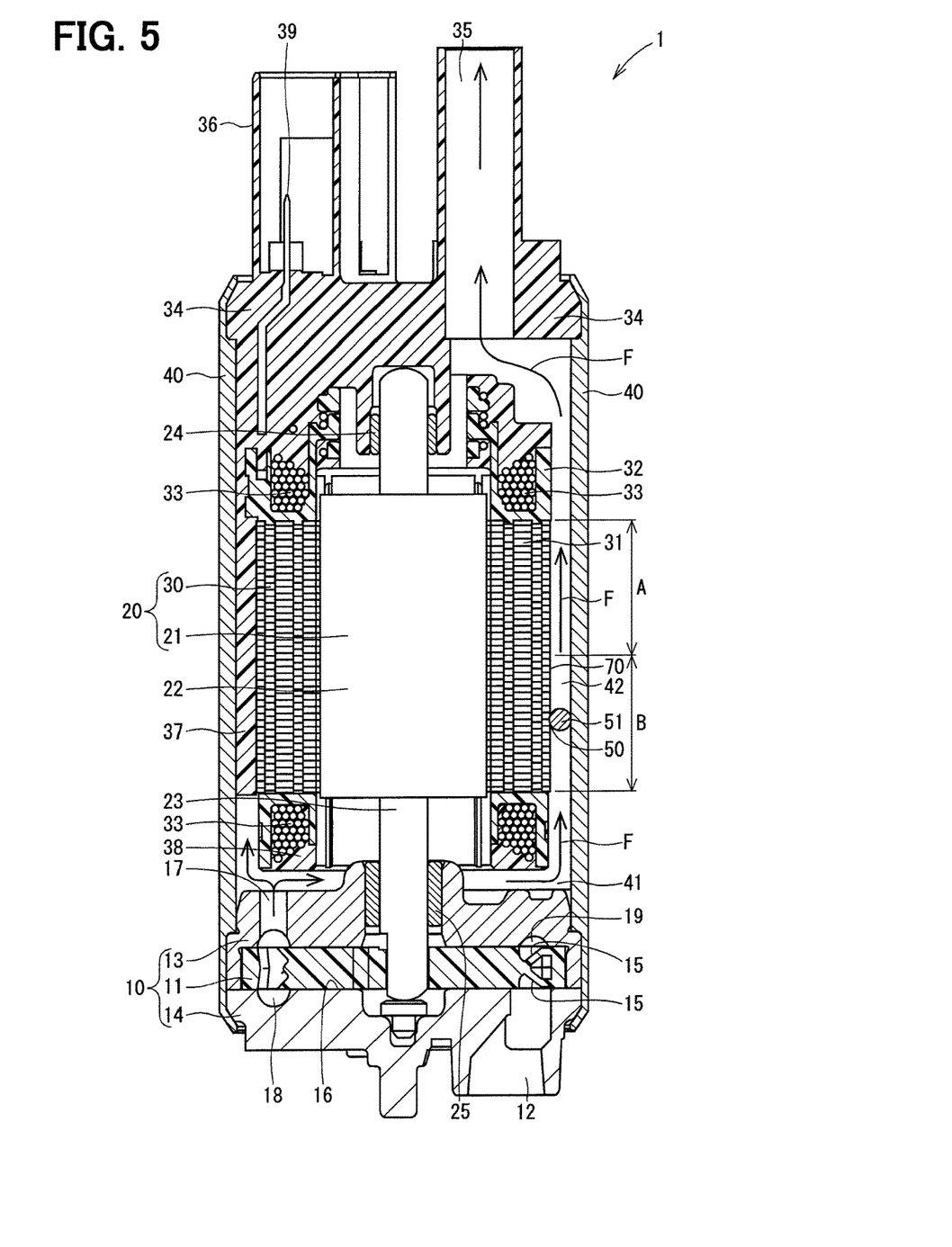
FIG. 5 is a descriptive view showing a state where rust is formed at an electrode contact portion in the first embodiment.

FIG. 5 schematically indicates a state where the rust 51, which is formed in the electrode contact portion 50, expands to a large size due to, for example, secular change.

When the rust 51, which is formed in the electrode contact portion 50, expands to the large size, the rust 51 is clamped between the inner wall of the housing 40 and the stator core 31. Therefore, movement of the rust 51 is limited. Furthermore, even if the rust 51 is detached from the electrode contact portion 50, the rust 51 will be outputted to the outside along with the flow of the fuel indicated by an arrow F in FIG. 5 through the fuel discharge conduit 35. This rust 51 will be captured by a filter 5, which is installed in the fuel conduit 3 that connects between the fuel pump 1 and the internal combustion engine 4.

Furthermore, even if the rust 51 is detached from the electrode contact portion 50 and freely falls downward in the direction of the gravitational force in a non-operating time of the fuel pump 1, the rust 51 will not entre the discharge port 17 because of that the outer flow passages 42, which are partitioned by the partitions 37 and the corners 311, extend in the axial direction, and the discharge port 17 is not located immediately below any of the electrode contact portions 50 in the direction of the gravitational force.

(Advantage of the Embodiment)

The fuel pump 1 of the present embodiment provides the following advantages.

(1) In the present embodiment, the electrode contact portions 50 are formed in the outer wall of the stator 30, which forms the outer flow passages 42.

Thereby, even if the rust 51 is formed in any of the electrode contact portions 50, the rust 51 will flow through the corresponding outer flow passage 42 and is outputted to the outside through the fuel discharge conduit 35 located on the opposite side of the motor arrangement 20, which is opposite from the pump arrangement 10. Therefore, intrusion of the rust 51 into the gap between the rotor 21 and the stator 30 is limited, and intrusion of the rust 51 into the inside of the pump arrangement 10 is limited. Therefore, in the fuel pump 1, the rotation of the motor arrangement 20 and the rotation of the pump arrangement 10 can be maintained.

(2) In the present embodiment, the electrode contact portions 50 are formed in the outer wall of the stator 30, which is located at the outer side of the stator core 31 in the radial direction of the stator core 31.

Therefore, when the rust 51, which is formed in the electrode contact portion 50, expands to the large size, the rust 51 will be caught between the stator 30 and the housing 40. Thus, movement of the rust 51 is limited. Therefore, in the fuel pump 1, the rotation of the motor arrangement 20 and the rotation of the pump arrangement 10 can be maintained.

(3) In the present embodiment, the electrode contact portions 50 are axially located on the pump arrangement side of the axial center of the stator core 31.

Therefore, even when the remaining quantity of the fuel in the fuel tank 2 becomes small, the fuel of the fuel chamber 41 can be drawn into the outer flow passages 42 by the surface tension. Thus, the axial area of each outer flow passage 42, which is axially located on the pump arrangement side of the axial center of the stator core 31, is held in the state where the axial area of the outer flow passage 42 is filled with the fuel. As a result, the exposure of the electrode contact portions 50 to the air is limited. Thereby, the formation of the rust 51 in the electrode contact portions 50 is limited.

(4) In the present embodiment, the distance C between the housing 40 and the stator 30, which form the outer flow passages 42, is set to the value that enables suctioning of the fuel from the fuel chamber 41 through the outer flow passages 42 by the surface tension of the fuel.

Therefore, in the fuel pump 1, the axial area of the outer flow passage 42, which is axially located on the pump arrangement side of the axial center of the stator core 31, can be held in the state where the axial area of the outer flow passage 42 is filled with the fuel.

(5) In the present embodiment, the electrode contact portions 50 are respectively placed at the corresponding locations, which are other than the location immediately above the discharge port 17 of the pump arrangement 10 in the direction of the gravitational force.

In this way, even if the rust 51, which is formed in the electrode contact portion 50, freely falls downward in the non-operating time of the fuel pump 1, the rust 51 will not entre the discharge port 17 of the pump arrangement 10. Therefore, in the fuel pump 1, the rotation of the pump arrangement 10 can be maintained.

(6) According to the present embodiment, the stator core 31 is configured into the polygonal form in the view taken in the axial direction, and the corners 311 of the polygonal form of the stator core 31 contact the inner wall of the housing 40.

In this way, the outer flow passages 42 are partitioned by the corners 311 of the stator core 31. Thus, when the rust 51, which is formed in the electrode contact portion 50, falls downward, the rust 51 is prevented from falling into the discharge port 17 of the pump arrangement 10.

(7) In the present embodiment, the stator 30 includes the partitions 37, which extend in the axial direction at the location between the stator core 31 and the housing 40.

In this way, the outer flow passages 42 are partitioned by the partitions 37. Thus, when the rust 51, which is formed in the electrode contact portion 50, falls downward, it is possible to limit both of the circumferential movement of the rust 51 in the middle of the falling movement of the rust 51 and the entry of the rust 51 into the discharge port 17 of the pump arrangement 10.

Second Embodiment

Figure 8:
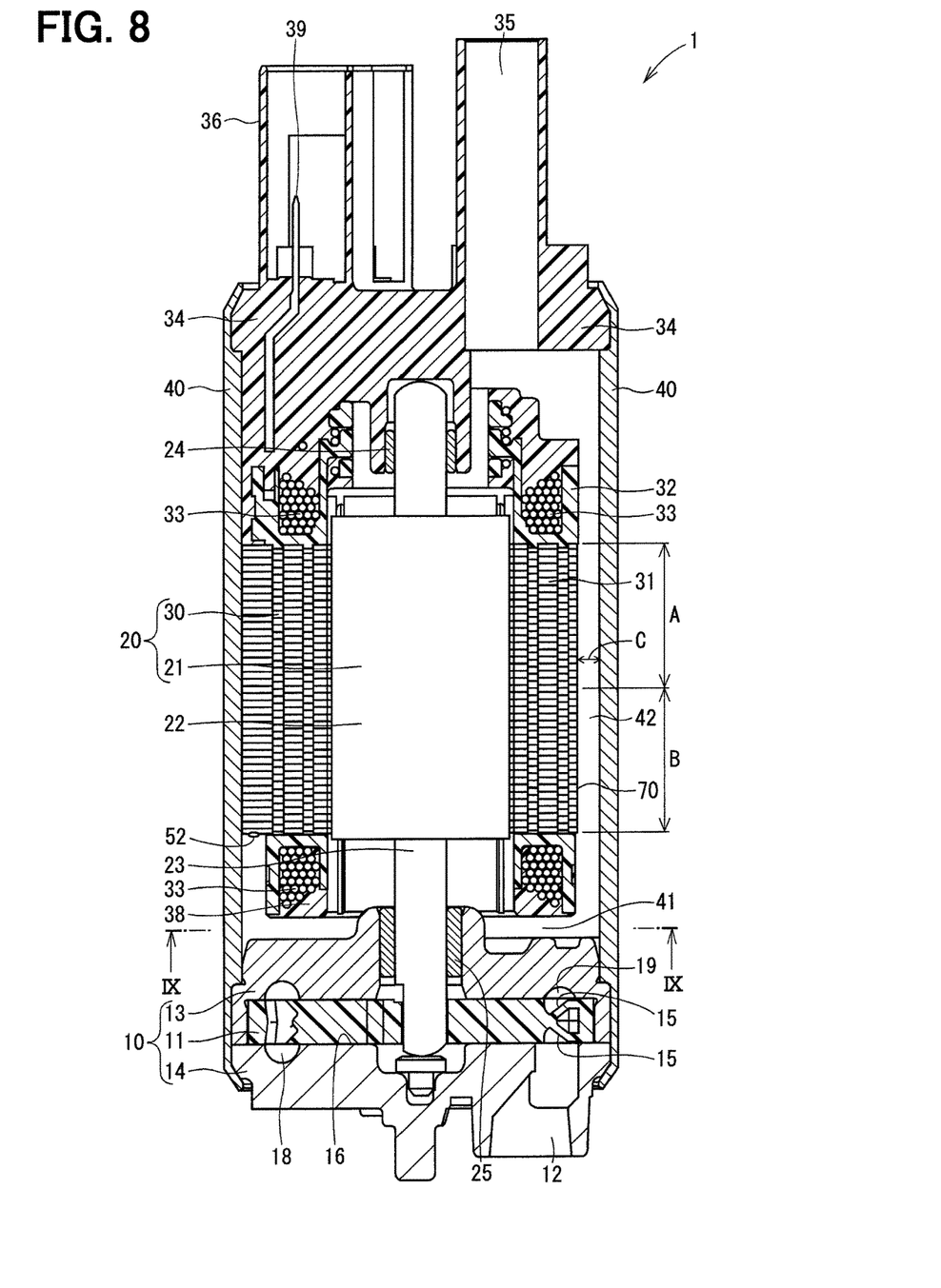
FIG. 8 is a cross-sectional view of a fuel pump according to a second embodiment of the present disclosure.
Figure 9:
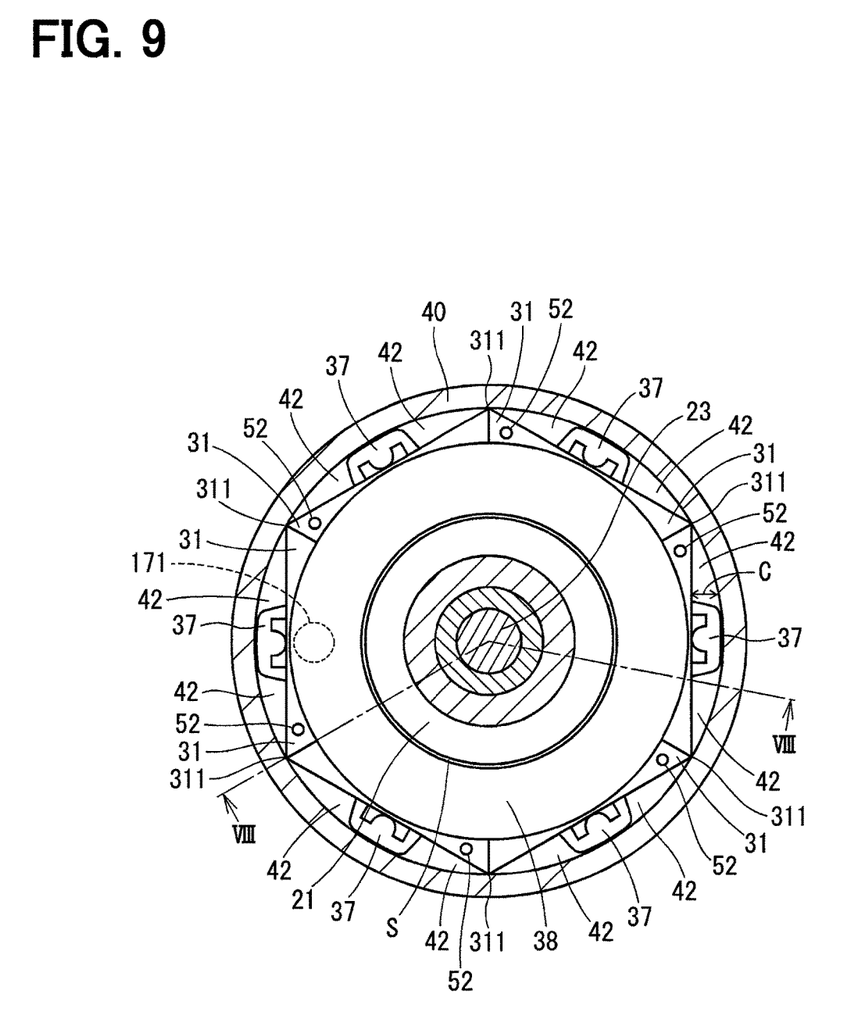
FIG. 9 is a cross-sectional view taken along line IX-IX in FIG. 8.

FIGS. 8 and 9 show a second embodiment of the present disclosure. In the second embodiment, components, which are substantially the same as those discussed in the first embodiment, will be indicated by the same reference numerals and will not be discussed further.

In the second embodiment, the electrode contact portions are formed in an end surface of the stator core 31, which is axially located on the pump arrangement side. That is, the electrode contact portions 52 are formed in the portion of the stator core 31 located on the radially outer side of the coil protective portion 38, which is configured into a cylindrical form. This portion of the stator core 31 is also the outer wall of the stator 30, which forms the outer flow passages 42.

Each one of the teeth of the stator core 31 is provided with a corresponding one of the electrode contact portions 52. The electrode contact portions 52 are respectively placed at the corresponding locations, which are other than the location immediately above the discharge port 17 of the pump arrangement 10 in the direction of the gravitational force.

With this construction, according to the second embodiment, the advantages, which are similar to those of the first embodiment, can be achieved.

Other Embodiments

In the above embodiments, the fuel pump, which has the brushless motor, has been described. In another embodiment, the fuel pump may be a fuel pump that has a brushed motor.

In the above embodiments, there is described the fuel pump, which includes the stator core having the six slots. In another embodiment, the fuel pump may have any number of the slots of the stator core.

The present disclosure is not limited to the above embodiments. The above embodiments may be combined in various ways within the principle of the present disclosure, and the present disclosure may be implemented in various other embodiments within the principle of the present disclosure.

The invention claimed is:

1. A fuel pump comprising:
a pump arrangement that has:
   a casing that includes a pump chamber, wherein the pump chamber is communicated with a suction port, through which fuel is drawn into the pump chamber;
   an impeller that pressurizes the fuel in the pump chamber; and
   a discharge port that discharges the fuel, which is pressurized through rotation of the impeller, from the pump chamber to an outside of the casing;
a motor arrangement that has:
   a rotor that is placed on one axial side of the impeller of the pump arrangement and rotates the impeller; and
   a stator that is configured into a ring form and is electroplated, wherein the stator is placed on a radially outer side of the rotor;
a housing that is configured into a tubular form and is placed on an outer side of the stator, wherein the housing forms a fuel chamber at a location between the pump arrangement and the motor arrangement, and the housing forms an outer flow passage on the outer side of the stator;
a fuel discharge conduit that is placed on an opposite side of the motor arrangement, which is opposite from the pump arrangement, wherein the fuel discharge conduit discharges the fuel, which flows from the discharge port of the pump arrangement through the motor arrangement, to an outside of the housing; and
an electrode contact portion, which is formed in an outer wall of a stator core of the stator that forms the outer flow passage, wherein:
the outer wall of the stator core includes a plated metal surface, which is electroplated on a surface of a magnetic material of the stator core at the outer wall of the stator core; and
the electrode contact portion is an exposed area of the plated metal surface, the exposed area of the plated metal surface is a trace of contact of an electrode to the outer wall of the stator core at a time of performing electroplating and is thereby not plated to expose the magnetic material at the outer wall of the stator core.

2. The fuel pump according to claim 1, wherein:
the stator includes a coil, which is wound around the stator core; and
the electrode contact portion is formed in the outer wall of the stator core, which is located at an outer side of the stator core in a radial direction.

3. The fuel pump according to claim 2, wherein:
the fuel pump is configured to be placed in a fuel tank;
the motor arrangement is configured to be placed at an upper side of the fuel pump in a direction of a gravitational force in the fuel tank, and the pump arrangement is configured to be placed at a lower side of the fuel pump in the direction of the gravitational force in the fuel tank; and
the electrode contact portion is placed on a side of an axial center of the stator core where the pump arrangement is placed.

4. The fuel pump according to claim 1, wherein a distance between the housing and the stator, which form the outer flow passage, is set to a value that enables suctioning of the fuel from the fuel chamber by a surface tension.

5. The fuel pump according to claim 1, wherein the electrode contact portion is placed in a location, which is other than a location that is immediately above the discharge port of the pump arrangement in a direction of a gravitational force.

6. The fuel pump according to claim 2, wherein the stator core is configured into a polygonal form in a view taken in an axial direction, and a plurality of corners of the polygonal form of the stator core contacts an inner wall of the housing.

7. The fuel pump according to claim 2, wherein the stator includes a partition, which extends in an axial direction at a location that is between the stator core and the housing.

8. The fuel pump according to claim 1, wherein:
the stator includes a resin portion made of a resin material; and
tin plating is used as the electroplating.

* * * * *